(12) United States Patent
Willis et al.

(10) Patent No.: US 6,675,583 B2
(45) Date of Patent: Jan. 13, 2004

(54) COMBUSTION METHOD

(75) Inventors: Jeffrey W. Willis, Los Angeles, CA (US); Guillermo Pont, Los Angeles, CA (US); Edward C. Edelman, Agoura Hills, CA (US); Gunther Linzner, Northridge, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 45 days.

(21) Appl. No.: 09/969,491

(22) Filed: Oct. 2, 2001

(65) Prior Publication Data
US 2002/0059791 A1 May 23, 2002

Related U.S. Application Data
(60) Provisional application No. 60/237,971, filed on Oct. 4, 2000.

(51) Int. Cl.[7] .................................................. F02C 7/232
(52) U.S. Cl. ........................................ 60/779; 60/39.094
(58) Field of Search ............................ 60/39.094, 772, 60/779

(56) References Cited

U.S. PATENT DOCUMENTS

| 4,041,695 | A |   | 8/1977  | Harper et al. ............ 60/39.02  |
| 4,062,183 | A | * | 12/1977 | Davies et al. ........... 60/39.094 |
| 4,423,595 | A |   | 1/1984  | McLean ..................... 60/261  |
| 5,417,054 | A |   | 5/1995  | Lee et al. ............... 60/39.094 |
| 5,819,524 | A |   | 10/1998 | Bosley et al.                       |
| 5,850,732 | A |   | 12/1998 | Willis et al.                       |
| 5,873,235 | A |   | 2/1999  | Bosley et al. ............. 60/39.03 |
| 5,899,673 | A |   | 5/1999  | Bosley et al.                       |
| 6,050,081 | A |   | 4/2000  | Jansen et al. ........... 60/39.094 |
| 6,125,624 | A |   | 10/2000 | Prociw .................... 60/39.094 |
| 6,405,522 | B1 |  | 6/2002  | Pont et al.                         |
| 6,487,096 | B1 |  | 11/2002 | Gilbreth et al.                     |

FOREIGN PATENT DOCUMENTS

WO          99/52193          10/1999

OTHER PUBLICATIONS

Patent Abstracts of Japan, publication No. 2000248694, publication date Dec. 9, 2000, 1 page.
Patent Abstracts of Japan, publication No. 2001153364, publication date Nov. 25, 1999, 1 page.

* cited by examiner

*Primary Examiner*—Louis J. Casaregola
(74) *Attorney, Agent, or Firm*—Sterne, Kessler, Goldstein & Fox

(57) ABSTRACT

Upon shutdown of a liquid fuel turbine engine, the liquid fuel supply is turned off and compressed air is passed through the fuel lines and fuel injectors to purge all remaining liquid fuel into the combustion chamber to be combusted therein.

12 Claims, 5 Drawing Sheets

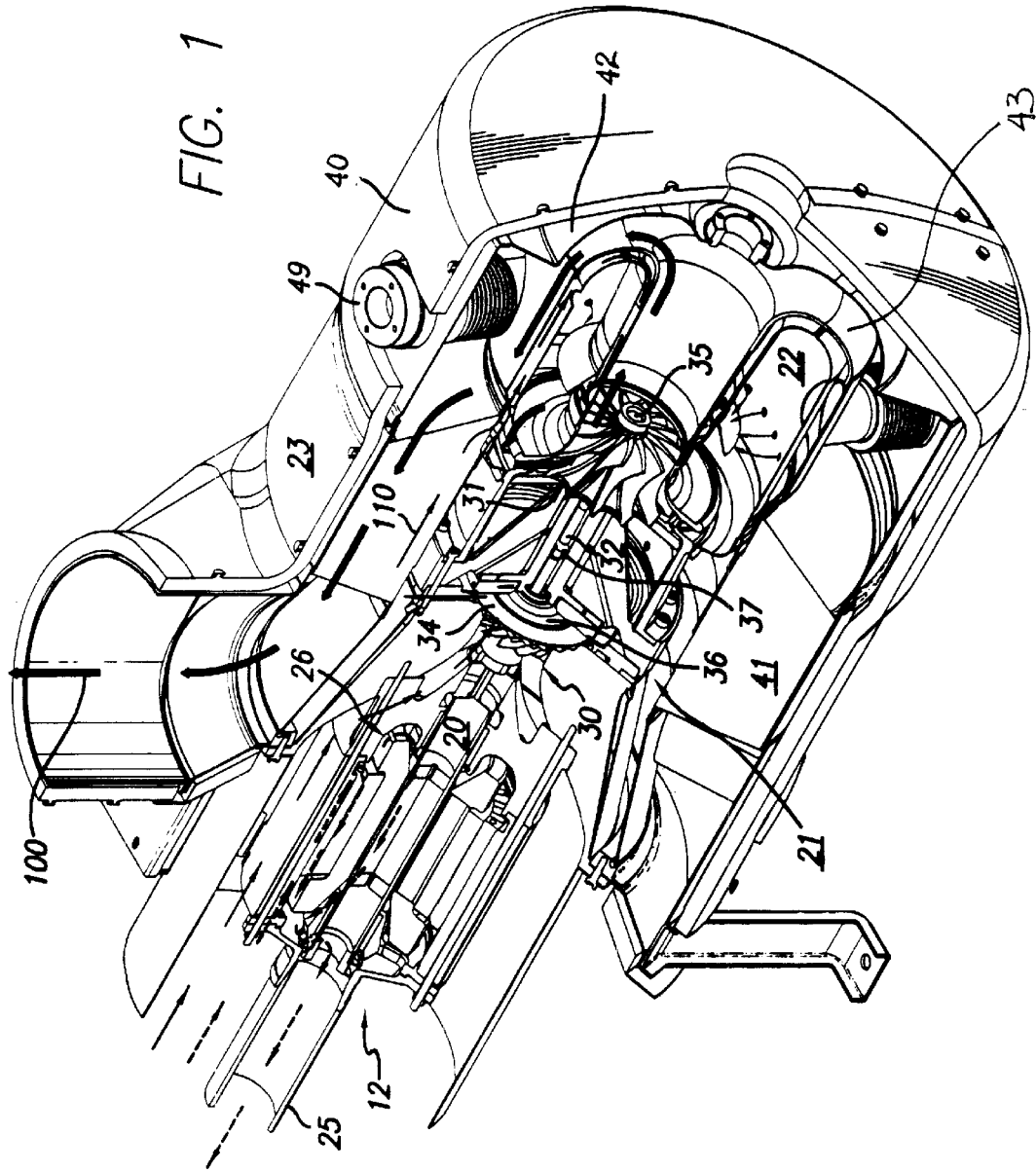

COMBUSTION METHOD

RELATED APPLICATIONS

This application claims the priority of provisional patent application Ser. No. 60/237,971 filed Oct. 4, 2000.

BACKGROUND OF THE INVENTION

In a gas turbine engine, inlet air is continuously compressed, mixed with fuel in an inflammable proportion, and then contacted with an ignition source to ignite the mixture that will then continue to burn. The heat energy thus released then flows in the combustion gases to a turbine where it is converted to rotary energy for driving equipment such as an electrical generator. The combustion gases are then exhausted to the atmosphere after exchanging some of their remaining heat to the incoming air provided from the compressor.

Quantities of air in excess of stoichiometric amounts are typically compressed and utilized to keep the combustor liner cool and dilute the combustor exhaust gases so as to avoid damage to the turbine nozzle and blades. Generally, primary sections of the combustor are operated near stoichiometric conditions that produce combustor gas temperatures up to approximately four thousand (4,000) degrees Fahrenheit. Further along the combustor, secondary air is admitted that raises the air-fuel ratio and lowers the gas temperatures so that the gases exiting the combustor are in the range of two thousand (2,000) degrees Fahrenheit.

It is well established that NOx formation is thermodynamically favored at high temperatures. Since the NOx formation reaction is so highly temperature dependent, decreasing the peak combustion temperature can provide an effective means of reducing NOx emissions from gas turbine engines, and so can limiting the residence time of the combustion products in the combustion zone. Operating the combustion process in a very lean condition (i.e., high excess air) is a known method of achieving lower temperatures and hence lower NOx emissions.

In a liquid fuel turbine system, the liquid fuel injector orifices or outlets are within the combustor and thus exposed to substantial heat. During normal operations, this does not present a problem since the flow of liquid fuel through the liquid fuel injector provides a cooling effect. Further, the propagation of combustion along with the flow of air serves to prevent undesirable overheating of the liquid fuel injectors. Once operation ceases, however, neither liquid fuel nor air flows through the liquid fuel injector. Consequently, residual heat in the combustor area can cause elevation of the temperature of the liquid fuel injectors.

In terms of the materials of which the liquid fuel injectors are constructed, this temperature elevation experienced upon cessation of operation does not present a problem. However, the presence of residual liquid fuel in the liquid fuel injector at such time can cause a coking problem. The liquid fuel is carbonaceous in nature and upon being heated will begin to undergo a destructive distillation reaction, producing a coke-like and/or tarry residue.

This tendency to deposit carbon on fuel flow passages when liquid fuel is exposed to hot surfaces inside a gas turbine (coking) can quickly build up and may become severe enough so as to restrict, or even completely block liquid fuel flow through the fuel injector passages. Because in small gas turbines the liquid fuel atomization is generally controlled by small orifices that are located in regions of high temperature, the coking problem is of particular importance. With generally small fuel passages and atomizers, the effects of coking are more pronounced in a small gas turbine and can lead to poor fuel flow distribution and poor atomization, resulting in increased emissions, reduced combustor performance, and reduced system life.

In general, liquid fuel systems are designed so that the liquid fuel will not be hot enough to coke prior to injection into the combustor or into the premixing section of a lean pre-vaporize premix (LPP) combustor. During a shut down procedure, any stagnant liquid fuel left in the fuel injectors or passages that experiences high enough temperatures will very rapidly coke and lead to the aforementioned problems. The general approach to remedy this 1problem has been to purge the liquid fuel system by utilizing the engine pressure to push the liquid fuel out of the liquid fuel system through the injectors and other fuel passages. This approach may be employed when the engine pressure is high enough to overcome the various flow restrictions of the liquid fuel system, but it also results in a known amount of liquid fuel being discarded to the atmosphere. Further, if the engine pressure is not high enough, the fuel injectors and passages may not be cleared of liquid fuel, thus leading to coking.

What is needed is a method of purging liquid fuel from the fuel injectors of a gas turbine combustor at shutdown before any portion of the fuel is transformed into a solid deposit by the residual heat in the combustor, and without discharging the purged liquid to the atmosphere.

SUMMARY OF THE INVENTION

In one aspect, the present invention provides a method of shutting down a turbine engine having a fuel line for conducting liquid fuel from a fuel supply to a combustor fuel injector, the method comprising shutting off the fuel supply and passing compressed gas through the fuel line to purge fuel from the fuel line and the fuel injector into the combustor.

In another aspect, the present invention provides a turbogenerator comprising a turbine; a combustor for combusting fuel and compressed air to generate hot gas to drive the turbine, the combustor including a fuel injector; a fuel line connected to the fuel injector to supply fuel to the combustor from a liquid fuel source; an electric generator rotationally coupled to the turbine to generate electric power; and a source of compressed gas selectively coupled to the fuel line for passing compressed gas through the fuel line after shutdown of the turbogenerator to purge fuel from the fuel line and the fuel injector into the combustor.

In a further aspect of the present invention, the purged fuel is combusted in the combustor, and an igniter in the combustor may be used to ignite the purged fuel in the combustor. In a yet further aspect of the invention, the compressed gas is regulated to control combustion of the purged fuel in the combustor, and the compressed gas pressure may be regulated in accordance with a predicted combustor pressure.

BRIEF DESCRIPTION OF THE DRAWINGS

FIG. 1 is a perspective view, partially cut away, of a turbogenerator with a combustion system according to the present invention;

DETAILED DESCRIPTION OF THE INVENTION

Figure 3:
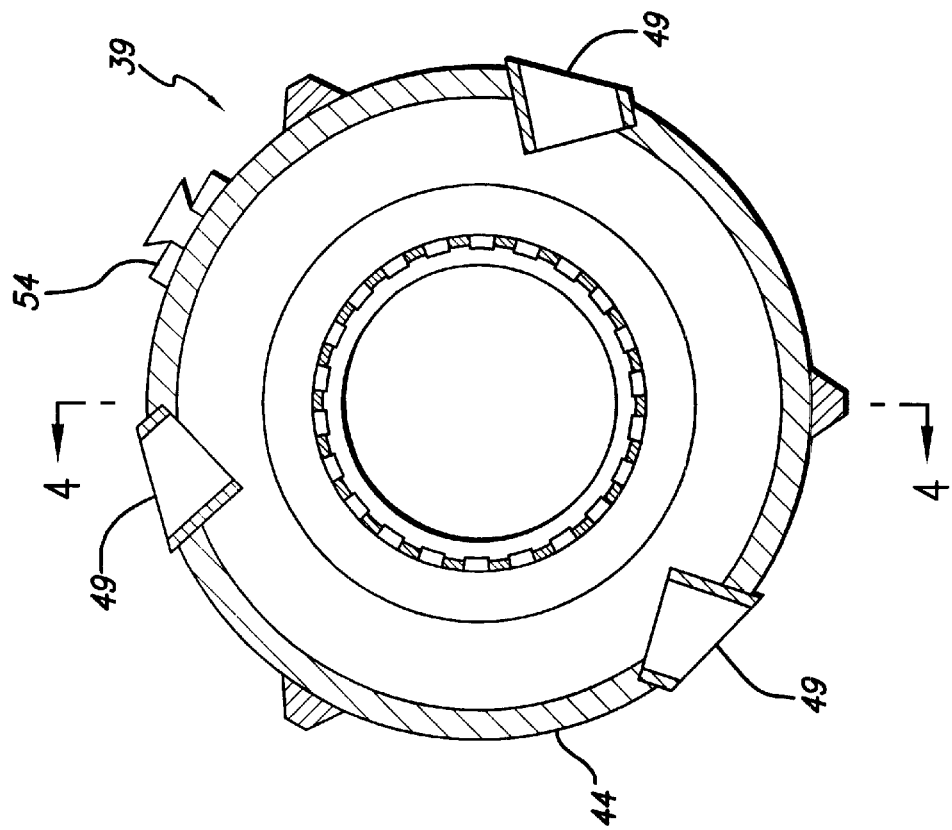
FIG. 3 is a sectional view of the combustor housing of FIG. 2 taken along line 3—3 of FIG. 2.

Referring to FIG. 1, integrated turbogenerator system 12 generally includes generator 20, power head 21, combustor 22, and recuperator (or heat exchanger) 23. Power head 21 of turbogenerator 12 includes compressor 30, turbine 31, and bearing rotor 32. Tie rod 33 to magnetic rotor 26 (which may be a permanent magnet) of generator 20 passes through bearing rotor 32. Compressor 30 includes compressor impeller or wheel 34 that draws air flowing from an annular air flow passage in outer cylindrical sleeve 29 around stator 27 of the generator 20. Turbine 31 includes turbine wheel 35 that receives hot exhaust gas flowing from combustor 22. Combustor 22 receives preheated air from recuperator 23 and fuel through a plurality of fuel injector guides 49. Compressor wheel 34 and turbine wheel 35 are supported on bearing shaft or rotor 32 having radially extending air-flow bearing rotor thrust disk 36. Bearing rotor 32 is rotatably supported by a single air-flow journal bearing within center bearing housing 37 while bearing rotor thrust disk 36 at the compressor end of bearing rotor 32 is rotatably supported by a bilateral air-flow thrust bearing.

Generator 20 includes magnetic rotor or sleeve 26 rotatably supported within generator stator 27 by a pair of spaced journal bearings. Both rotor 26 and stator 27 may include permanent magnets. Air is drawn by the rotation of rotor 26 and travels between rotor 26 and stator 27 and further through an annular space formed radially outward of the stator to cool generator 20. Inner sleeve 25 serves to separate the air expelled by rotor 26 from the air being drawn in by compressor 30, thereby preventing preheated air from being drawn in by the compressor and adversely affecting the performance of the compressor (due to the lower density of preheated air as opposed to ambient-temperature air).

In operation, air is drawn through sleeve 29 by compressor 30, compressed, and directed to flow into recuperator 23. Recuperator 23 includes annular housing 40 with heat transfer section or core 41, exhaust gas dome 42, and combustor dome 43. Heat from exhaust gas 110 exiting turbine 31 is used to preheat compressed air 100 flowing through recuperator 23 before it enters combustor 22, where the preheated air is mixed with fuel and ignited such as by electrical spark, hot surface ignition, or catalyst. The fuel may also be premixed with all or a portion of the preheated air prior to injection into the combustor. The resulting combustion gas expands in turbine 31 to drive turbine impeller 35 and, through common shaft 32, drive compressor 30 and rotor 26 of generator 20. The expanded turbine exhaust gas then exits turbine 31 and flows through recuperator 23 before being discharged from turbogenerator 12.

Figure 2:
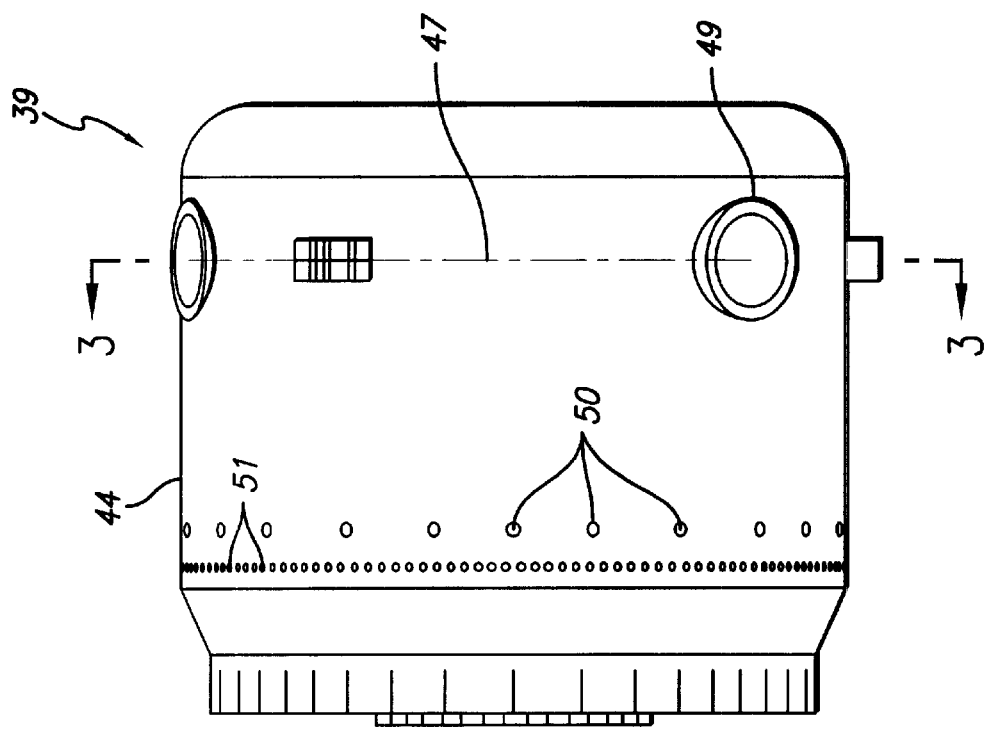
FIG. 2 is a plan view of the combustor housing of the turbogenerator of FIG. 1.
Figure 4:
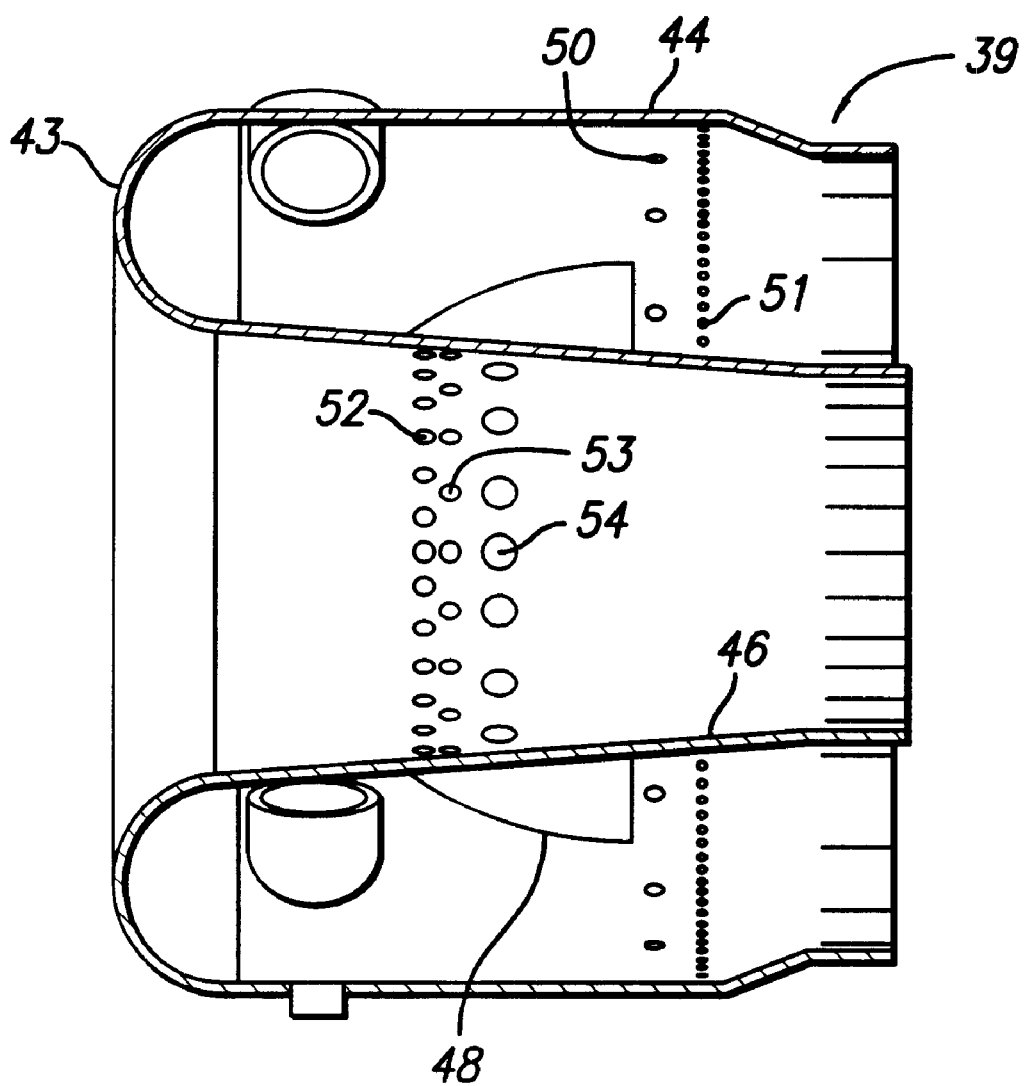
FIG. 4 is a sectional view of the combustor housing of FIG. 3 taken along line 4—4 of FIG. 3.

Referring to FIGS. 2–4, combustor housing 39 of combustor 22 generally comprises cylindrical outer liner 44 and tapered inner liner 46 that, together with combustor dome 43, form generally expanding annular combustion housing or chamber 39 from combustor dome 43 to turbine 31. Plurality of fuel injector guides 49 may position the fuel injectors 14 to tangentially introduce a fuel/air mixture at the combustor dome 43 end of the annular combustion housing 39 along the fuel injector axis or centerline 47. Centerline 47 includes an igniter cap to position an igniter (not shown) within the combustor housing 39. Combustion dome 43 is rounded out to permit the swirl pattern from fuel injectors 14 to fully develop and to reduce structural stress loads in the combustor.

Flow control baffle 48 extends from tapered inner liner 46 into annular combustion housing 39. Baffle 48 is typically skirt-shaped and may extend between one-third and one-half of the distance between tapered inner liner 46 and cylindrical outer liner 44. Three rows of spaced offset air dilution holes 52, 53, and 54 are formed in tapered-inner liner 46 underneath flow control baffle 48 to introduce dilution air into annular combustion housing 39. The first two (2) rows of air dilution holes 52 and 53 (closest to fuel injector centerline 47) may be the same size as one another but both are typically smaller than the third row of air dilution holes 54.

In addition, two (2) rows of a plurality of spaced air dilution holes 50 and 51 are formed in cylindrical outer liner 44 to introduce more dilution air downstream from flow control baffle 48. The plurality of holes 50 closest to flow control baffle 48 may be larger and less numerous than the second row of holes 51.

Fuel may be provided individually to each fuel injector or alternatively a fuel manifold may be provided to supply fuel to all three fuel injectors. The fuel manifold may include a fuel inlet to receive fuel from a fuel source and flow control valves 17 on each fuel line from the manifold to the individual fuel injectors. To sustain low power operation, maintain fuel economy and low emissions, the flow control valves may be individually controlled to an on/off position (to separately use any combination of fuel injectors individually) or may be modulated together. The flow control valves can be opened by fuel pressure or their operation can be controlled or augmented with a solenoid.

A more detailed description of a preferred combustor and fuel injector system can be found in U.S. Pat. No. 5,850,732, issued Dec. 22, 1998 to Jeffrey W. Willis et al, entitled "Low Emissions Combustion System", assigned to the same assignee as this application, and hereby incorporated in its entirety by reference thereto.

The turbogenerator has a steady-state turbine exhaust temperature limit and is typically operated at this limit at most speeds to maximize efficiency. This turbine exhaust temperature limit is decreased at low ambient temperatures to prevent engine surge.

Figure 5:
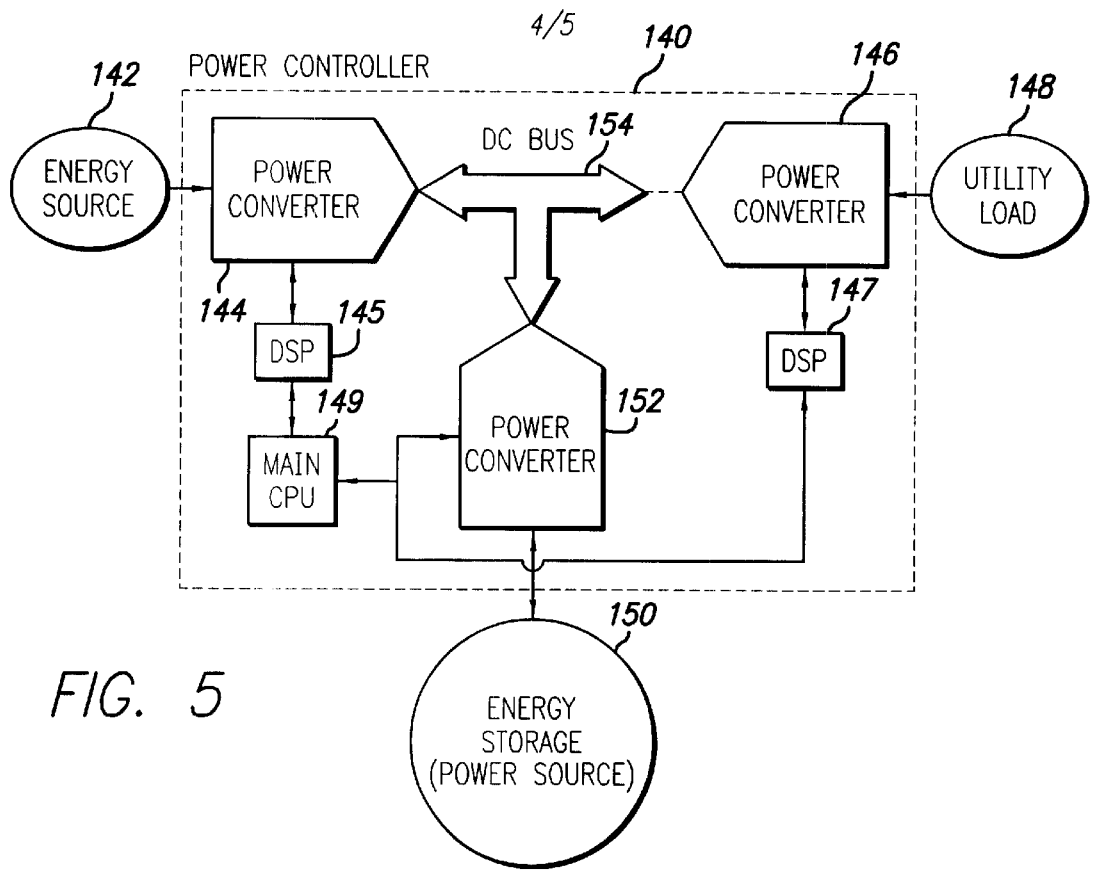
FIG. 5 is a block diagram of a power controller used with the turbogenerator of FIG. 1.

Referring to FIG. 5, power controller 140 may be a digital controller, and enables a distributed generation power networking system by providing bi-directional (i.e. reconfigurable) power converters connected to common DC bus 154 to connect a plurality of energy generation and/or storage components. Each power converter 144 and 146 operates essentially as a customized bi-directional switching converter configured, under the control of power controller 140, to provide an interface for a specific energy component to DC bus 154. In this manner power controller 140 controls how each energy component sinks or sources power to or from DC bus 154, and thus regulates DC bus 154. In this way, various energy components can be used to supply, store and/or use power in an efficient manner.

The energy components may include energy source 142 which may be turbogenerator 12, energy load 148 which may be an utility grid, and energy storage device 150 which may be a battery. Energy source 142 is connected to DC bus 154 via power converter 144 under the control of signal processor 145, which may be a digital signal processor (DSP). Energy load 148 is connected to DC bus 154 via power converter 146 under the control of signal processor 147. Energy storage device 150 is likewise connected to DC bus 154 via power converter 152. Main CPU 149 provides supervisory operation of power controller 140 by controlling signal processors 145 and 147 and power converters 144, 146, and 152.

Main CPU 149 provides both local control and sufficient intelligence to form a distributed processing system. In the case of turbogenerator 12 operating as energy source 142, power controller 140 regulates turbine speed to control the power output independently of turbine speed to regulate the bus voltage.

With continued reference to FIG. 5, turbogenerator 12 typically provides power to DC bus via power converter 144 during normal power generation mode. Similarly, during power generation, power converter 146 converts the power on DC bus 154 to the form required by utility/load 148. During utility start up, power converters 144 and 146 are controlled by the main processor to operate in different modes. For example, the energy needed to start turbogenerator 12 may be provided by load/utility 148 (utility start) or by energy source 150 (battery start). During a utility start up, power converter 146 is required to apply power from load/utility 148 to the DC bus for subsequent conversion by power converter 144 to AC power required by turbogenerator 12 to start up. During utility start, turbogenerator 12 is controlled in a local feedback loop to maintain the turbine revolutions per minute (RPM).

Similarly, in a battery start, the power applied to DC bus 154 to start turbogenerator 12 is provided by energy storage device 150. Energy storage device 150 applies power to DC bus 154 through power converter 152, which allows enough power to flow to DC bus 154 to start turbogenerator 12 while limiting current surge. A more detailed description of a power controller suitable for use with the invention can be found in U.S. patent application Ser. No. 09/207,817, filed Dec. 8, 1998, by Mark G. Gilbreth et al., entitled "Power Controller", (now U.S. Pat. No. 6,487,096), assigned to the same assignee as this application, and hereby incorporated in its entirety by reference thereto.

Figure 6:
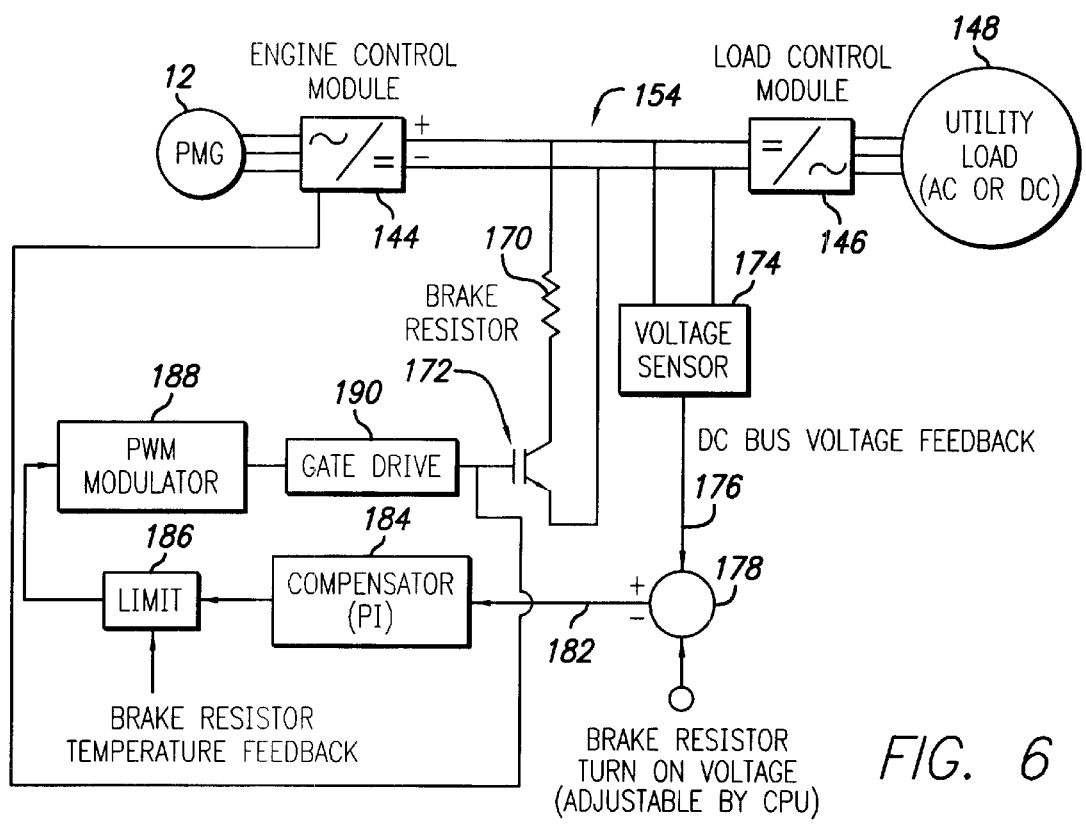
FIG. 6 is a block diagram of the power controller of FIG. 5 including a dynamic brake resistor.

Referring to FIG. 6, power controller 140 incorporates dynamic brake resistor 170 and associated controls. Turbogenerator 12 produces three phase AC power that is applied to AC-to-DC power converter 144 (labeled in FIG. 6 as the engine control module). Power converter 144 applies DC voltage to DC bus 154, which is also connected to DC-to-AC power converter 146 (labeled in FIG. 6 as the load control module). Power converter 146 is connected to load 148, which may be a utility grid.

Brake resistor 170 is connected across DC bus 154. Power in the DC bus can be dissipated in brake resistor 170 by modulation of switch 172. Voltage sensor 174 is also connected across DC bus 154 to produce DC bus voltage signal 176 that is compared in comparator 178 with brake resistor turn on voltage signal 180 to produce DC bus error signal 182. Brake resistor turn on voltage signal 180 is adjustable by CPU 149.

DC bus error signal 182 from comparator 178 is used to control the modulation of switch 172 after being conditioned through proportional integral compensator 184, brake resistor temperature feedback limit 186, pulse width modulator 188, and gate drive 190. Switch 172 may be an IGBT switch, although other switches can be utilized. Switch 172 is controlled in accordance with the magnitude of DC bus voltage signal 176. CPU 149 (as shown in FIG. 5) typically maintains the DC bus voltage to a selected value by appropriate control of the power flowing through load control module 146 and engine control module 144. If a rise in the DC bus voltage is detected, switch 172 is modulated on and off to allow power to discharge through brake resistor 170 until the DC bus voltage is restored to the desired, selected value.

As outlined above, a typical turbogenerator combustion system is a low emissions system including a gas turbine coupled with a recuperator. A relatively small amount of fuel is required at idle speeds because the recuperator is capable of supplying most of the energy required to sustain gas turbine operation. To achieve low emissions at operating speed, the fuel provided to the turbine combustor is diluted into a large volume of air, thereby resulting in a high air-to-fuel ratio (AFR) mixture that reduces the stability of the combustion. If the AFR increases beyond a certain level, combustion may cease and cause a flame-out, resulting in a time consuming shutdown and restart cycle.

In a multi-injector combustion system, one approach to preventing flame-out is to operate on fewer injectors. When low levels of fuel flow are detected, the delivery of fuel to some injectors is turned off. By turning off injectors, fuel flow can be concentrated into fewer injectors to reduce AFR and increase combustion stability. At very low power levels, even operating on a single injector may not provide low enough AFR levels to prevent flame-out conditions. An example of a multi-injector combustion system suitable for use with the invention is described in U.S. patent application Ser. No. 09/453,825 filed Dec. 1, 1999, by Guillermo Pont et al., entitled "System and Method for Modular Control of a Multi-Fuel Low Emissions Turbogenerator", (now U.S. Pat. No. 6,405,522). assigned to the same assignee as this application and incorporated herein in its entirety by reference thereto.

Figure 7:
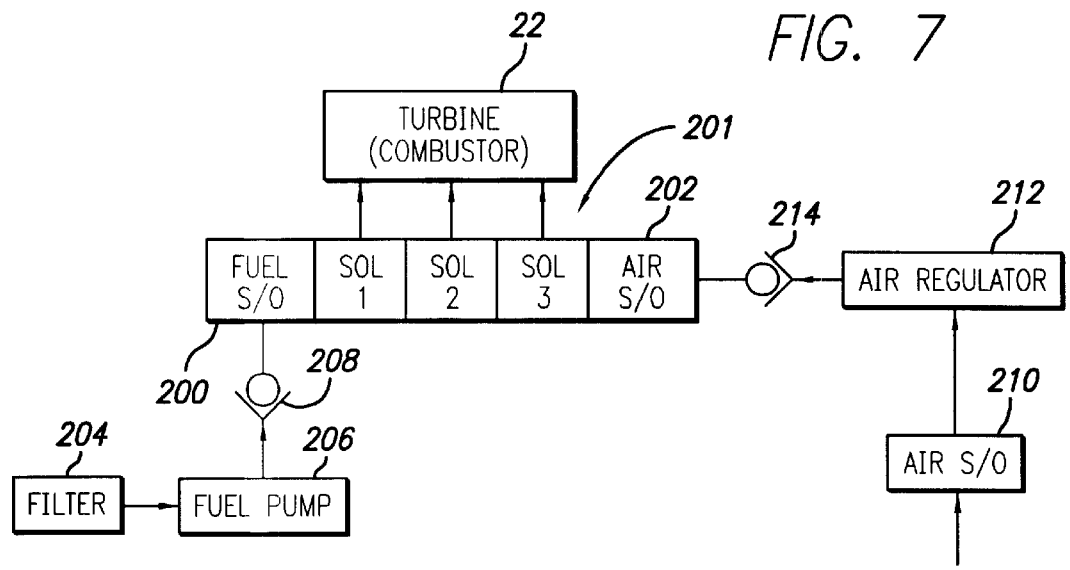
FIG. 7 is a block diagram of a shut down burn system for the turbogenerator of FIG. 1.
Figure 8:
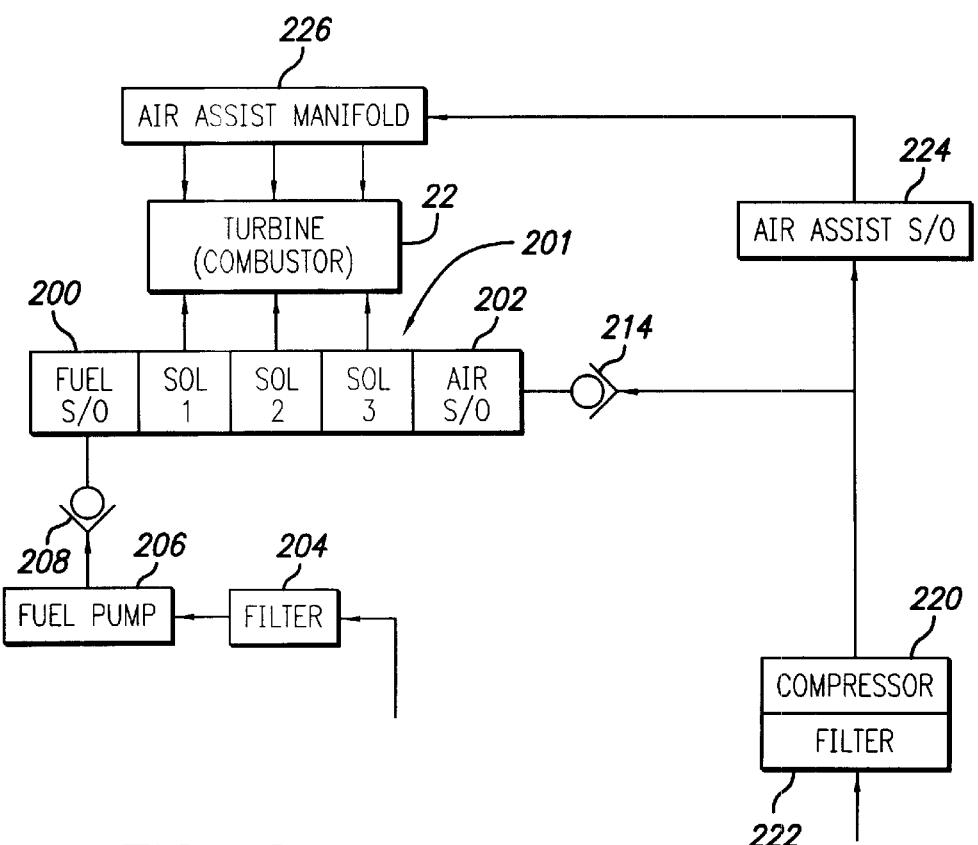
FIG. 8 is a block diagram of an alternate shut down burn system for the turbogenerator of FIG. 1.

Referring to FIGS. 7 and 8, turbine combustor 22 has a plurality of liquid fuel injectors, each controlled by a respective solenoid SOL1, SOL2, SOL3. Fuel shut/off solenoid 200 controls the flow of liquid fuel to manifold 201, that can also receive compressed air through air shut/off solenoid 202. The liquid fuel is supplied to manifold 201 by fuel pump 206 through filter 204 and check valve 208. The compressed air is supplied to manifold 201 from a compressed air source (not shown) through compressed air shut/off valve 210, compressed air regulator 212, and check valve 214. Check valves 208 and 214 can be replaced by any other means for generating pressure and controlling flow.

In operation, when the turbogenerator is commanded to shut down, fuel pump 206 (or fuel control valve) and fuel shut/off solenoid 200 are closed, thus stopping the flow of liquid fuel from the main fuel supply. At the same time, compressed air shut/off valve 210 and compressed air shut/off solenoid 202 are opened, allowing compressed air into fuel manifold 201. This air must be at pressures higher than the combustion chamber pressure to be able to force the fuel remaining in manifold 201 and injectors into the combustion chamber. The fuel in manifold 201 thus continues to flow through the injectors and into the combustor, thereby maintaining combustion for a short period of time following the shut down command. If combustion is interrupted, an igniter can be turned on to re-establish and complete combustion of the purged fuel.

The method of the invention ensures that the fuel passages and fuel injectors are free of liquid fuel following shutdown of the system, and that fuel that would otherwise be discarded is completely combusted. While this does result in continued power generation by the system for a short time after shut down is commanded, brake resistor 170 connected across DC bus 154 can absorb such excess power. The additional power generated can also be stored in energy storage device 150 or applied to load 148.

The flow and pressure of the liquid fuel to manifold 201 may be controlled by a liquid fuel pressurization and control system such as described in U.S. Pat. No. 5,873,235 issued Feb. 23, 1999 to Robert W. Bosley et al., entitled "Liquid Fuel Pressurization and Control Method," assigned to the same assignee as this application and incorporated herein in its entirety by reference thereto.

Referring to FIG. 8, compressed air for the shut down burn is available from air assist compressor 220 and associated filter 222, which supplies compressed assist air to air assist manifold 226 through air assist shut/off valve 224. Air compressor 220 may be regulated by measuring the air compressor discharge pressure and comparing this feedback to the predicted combustion pressure. The combustion pressure may be calculated based upon turbine speed, and a look-up table listing values for combustion pressure as a function of turbine speed may be built into the controller for use in regulating the air compressor during shut down purge. By regulating the air pressure, the fuel flow (which is a function of the pressure drop across the fuel injectors) during the shutdown burn is optimized to insure complete combustion of the fuel.

Air assist compressor 220 may be a helical flow compressor such as described in U.S. Pat. No. 5,899,673 issued May 4, 1999 to Robert W. Bosley et al., entitled "Helical Flow Compressor/Turbine Permanent Magnet Motor Generator," assigned to the same assignee as this application and incorporated herein in its entirety by reference thereto. Such a compressor may be utilized as an air compressor as described in U.S. Pat. No. 5,819,524 issued Oct. 13, 1998 to Robert W. Bosley et al. entitled "Gaseous Fuel Compression and Control System," assigned to the same assignee as this application and incorporated herein in its entirety by reference thereto.

The present invention may be employed with turbogenerators using various types of fuel injectors, including airblast, or air assist atomizers, and pressure atomizers. Pressure atomizers would typically require higher air pressures to purge liquid fuel at shutdown.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention, as defined and limited solely by the following claims.

What is claimed is:

1. A method of shutting down a turbine engine having at least one fuel line for conducting liquid fuel from a fuel supply to at least one fuel injector, comprising:

shutting off the fuel supply;

passing compressed gas through the at least one fuel line into the combustor to purge fuel from the at least one fuel line and the at least one fuel injector;

combusting the purged fuel from the at least one fuel line and the at least one fuel injector in the combustor,
wherein passing the compressed gas comprises providing the compressed gas from a compressed gas source through a regulator, and
wherein providing the compressed gas comprises regulating the compressed gas pressure.

2. The method of claim 1, wherein regulating the compressed gas pressure comprises:

regulating the compressed gas pressure to control combustion of the purged fuel in the combustor.

3. The method of claim 2, wherein regulating the compressed gas pressure comprises:

regulating the compressed gas pressure to control combustion of the purged fuel in the combustor in accordance with a predicted combustor pressure.

4. The method of claim 3, wherein regulating the compressed gas pressure comprises:

regulating the compressed gas pressure to control combustion of the purged fuel in the combustor in accordance with a predicted combustor pressure, the combustor pressure predicted based upon turbine speed.

5. The method of claim 4, further comprising:

measuring turbine speed to predict combustor pressure.

6. The method of claim 5, further comprising:

providing a look-up table containing a predicted combustor pressure as a function of measured turbine speed.

7. The method of claim 1, further comprising:

discharging power generated by the combustion of the purged fuel.

8. The method of claim 7, wherein the turbine is connected to an electric generator, the method further comprising:

discharging additional electric power generated by the electric generator due to the combustion of the purged fuel.

9. The method of claim 8, wherein discharging additional electric power comprises:

discharging additional electric power to any combination of one or more selected from the group including brake resistors, energy storage devices, and electric loads.

10. The method of claim 1, further comprising:

igniting the purged fuel in the combustor to complete combustion of the purged fuel.

11. The method of claim 1, wherein the compressed gas source is selected from the group including gas compressors and compressed gas tanks.

12. The method of claim 11, wherein the compressed gas is compressed air.

* * * * *